US009560048B2

(12) United States Patent
Liu et al.

(10) Patent No.: US 9,560,048 B2
(45) Date of Patent: Jan. 31, 2017

(54) METHOD FOR UPDATING IDENTITY INFORMATION ABOUT PACKET GATEWAY, AAA SERVER AND PACKET GATEWAY

(71) Applicant: ZTE CORPORATION, Guangdong (CN)

(72) Inventors: Guoyan Liu, Shenzhen (CN); Chunhui Zhu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 107 days.

(21) Appl. No.: 14/408,311

(22) PCT Filed: May 13, 2013

(86) PCT No.: PCT/CN2013/075546
§ 371 (c)(1),
(2) Date: Dec. 16, 2014

(87) PCT Pub. No.: WO2013/189217
PCT Pub. Date: Dec. 27, 2013

(65) Prior Publication Data
US 2016/0119347 A1    Apr. 28, 2016

(30) Foreign Application Priority Data
Jun. 21, 2012  (CN) .......................... 2012 1 0207219

(51) Int. Cl.
*H04L 29/06* (2006.01)
*H04W 12/06* (2009.01)
(Continued)

(52) U.S. Cl.
CPC ....... *H04L 63/0892* (2013.01); *H04L 63/0281* (2013.01); *H04W 8/24* (2013.01);
(Continued)

(58) Field of Classification Search
CPC .. H04L 29/06; H04L 63/0281; H04L 63/0892; H04L 63/162; H04W 12/06; H04W 36/14; H04W 8/24; H04W 76/00; H04W 92/02; H04W 88/16
See application file for complete search history.

(56) References Cited

U.S. PATENT DOCUMENTS

2009/0285179 A1    11/2009  Jones et al.

FOREIGN PATENT DOCUMENTS

| CN | 101778446 A | 7/2010 |
| CN | 102348193 A | 2/2012 |
| WO | 2009118056 A1 | 10/2009 |

OTHER PUBLICATIONS

ETSI TS 123 402 v10.4.0, UMTS LTE Architecture enhancements for non-3GPP accesses, Jun. 2011.*
(Continued)

*Primary Examiner* — Faruk Hamza
*Assistant Examiner* — Aixa Guadalupe-Cruz
(74) *Attorney, Agent, or Firm* — Ling Wu; Stephen Yang; Ling and Yang Intellectual Property

(57) ABSTRACT

A method for updating identity information of a packet gateway, an authentication, authorization, and accounting (AAA) server and a packet gateway. The method includes: a decision-making network element receiving a message which carries user equipment (UE) capability indication information and is sent by an information transmission network element; the decision-making network element deciding whether to update identity information of the packet gateway or not according to the UE capability indication information carried in the message and/or local information. The technical solution can be applied to distinguish R11 UE and R12 UE, and to ensure supporting both the R11 UE and the R12 UE normally accessing to a 3GPP (Continued)

core network through a 3GPP access system and a non-3GPP access system simultaneously.

10 Claims, 6 Drawing Sheets

(51) Int. Cl.
*H04W 8/24* (2009.01)
*H04W 36/14* (2009.01)
*H04W 76/00* (2009.01)
*H04W 88/16* (2009.01)
*H04W 92/02* (2009.01)

(52) U.S. Cl.
CPC ........... *H04W 12/06* (2013.01); *H04W 36/14* (2013.01); *H04L 63/162* (2013.01); *H04W 76/00* (2013.01); *H04W 88/16* (2013.01); *H04W 92/02* (2013.01)

(56) References Cited

OTHER PUBLICATIONS

Universal Mobile Telecommunications System (UMTS); LTE; Architecture enhancements for non-3GPP accesses (3GPP TS 23.402 version 9.12.0 Release 9); ETSI TS 123 402 V9.12.0 (Mar. 2012).

* cited by examiner

METHOD FOR UPDATING IDENTITY INFORMATION ABOUT PACKET GATEWAY, AAA SERVER AND PACKET GATEWAY

TECHNICAL FIELD

The present document relates to the field of mobile communications, and more particularly, to a method for updating identity information of a packet gateway, an information transmission method, an Authentication, Authorization, and Accounting (AAA) server, a trusted non-3GPP access network element and a packet gateway.

BACKGROUND

The Evolved Packet System (EPS) in the 3rd Generation Partnership Project (3GPP) consists of Evolved Universal Terrestrial Radio Access Network (E-UTRAN), Mobility Management Entity (MME), Serving Gateway (S-GW), Packet Data Network Gateway (PDN GW, also referred to as P-GW), and Home Subscriber Server (HSS).

The EPS supports interworking with the non-3GPP system, as shown in FIG. 1, wherein, the interworking with the non-3GPP system is implemented with the S2a/b/c interface, and the PDN GW works as an anchor point between the 3GPP system and the non-3GPP system. In the EPS system architectural diagram, the non-3GPP system access is divided into untrusted non-3GPP access and trusted non-3GPP access; wherein the untrusted non-3GPP access needs to go through the evolved packet data gateway (ePDG) in order to connect with the PDN GW, the interface between the ePDG and the PDN GW is S2b; the trusted non-3GPP access can directly connect with the PDN GW through the S2a interface, and the S2a interface uses the Proxy Mobile Internet Protocol (PMIP) for information exchange; in addition, the S2c interface provides user plane related control and mobility support between the User Equipment (UE) and the PDN GW, and its supporting mobility management protocol is the Mobile IPv6 Support for Dual Stack Hosts and Routers (DSMIPv6), which can be used for both the untrusted non-3GPP access and the trusted non-3GPP access.

The Wireless Local Area Network (WLAN) can be used as a non-3GPP system to access to the Evolved Packet Core (EPC), and this involves a lot of interconnection issues of the fixed mobile convergence that are concerned by many operators.

Currently, there is a lot of study on the process and policy interoperability of the S2b interface and the S2c interface, but there is little study on the S2a interface. The Study on S2a Mobility based On GTP & WLAN access to EPC (SaMOG) is mainly to study the interconnection problem in the case that the WLAN works as a trusted non-3GPP IP access network (TNAN) and the UE accesses to the EPC through the S2a interface. In the related art, as shown in FIG. 2, there are primarily two modes for the process of the UE accessing to the 3GPP EPC through the non-3GPP access network if differentiating according to how to trigger the non-3GPP access network to initiate a tunnel establishment to the PDN GW, and the two modes are specifically described as follows:

mode one: after the UE completes the non-3GPP specific process and the Extensible Authentication Protocol (EAP) authentication process, the Layer 3 (L3) message is executed between the UE and the TNAN network element, then after the TNAN receives the L3 message, it initiates a tunnel establishment process to the PDN GW of the mobile core network.

Mode two: besides of the L3 messages, the Layer 2 (L2) messages such as the EAP messages can also be used as a triggering mode. After the UE completes the non-3GPP specific process and the EAP authentication process, and after the TNAN receives the EAP authentication success message, it initiates a tunnel establishment process to the PDN GW of the mobile core network.

The research scheme of the SaMOG is divided into scheme that has no effect on the UE and scheme that has an effect on the UE. The so-called scheme having no effect on the UE means that the UE does not support transmitting the Access Point Name (APN) information, additional Packet Data Network (PDN) connection, as well as the handover process between the access systems, and so on, and such a UE corresponds to the UE prior to the Release 11 (R11) of the 3GPP standards, and is referred to as R11 UE hereinafter; while the scheme having an effect on the UE refers to that the UE supports transmitting the APN information, the additional PDN connection, as well as the handover process between the access systems, and so on, such a UE corresponds to the UE in the Release 12 (R12) of the 3GPP standard, and is hereinafter referred to as R12 UE; in the related art, a specific implementation to ensure the UE subsequently performing a seamless handover between the access systems is as follows: when the UE first accesses to the 3GPP system or the non-3GPP system, after it selects the PDN GW, the PDN GW needs to update the PDN GW identity to the HSS; then, when the UE switches, the target access system of the handover acquires the previously saved PDN GW identity from the HSS. Moreover, if the PDN GW identity that is saved by the HSS and associated with the same APN is to be updated, the HSS updates the PDN GW identity to the MME or to the non-3GPP network element via the AAA server.

For the scheme having no effect on the UE, although the UE does not support the handover procedure, it can independently access to the 3GPP core network via the WLAN access system and the 3GPP access system simultaneously; moreover, the UE may use the same APN, but access to different PDN GWs. In the related art, if the PDN GW does not receive a handover indication form the UE, it considers that both of the different accesses are the first access of the UE, therefore when the UE first accesses via the WLAN access system, the PDN GW updates the PDN GW identity to the HSS; then, when the UE accesses via the 3GPP access system, the PDN GW updates the PDN GW identity to the HSS again, at this time, the new PDN GW identity overwrites the previously saved PDN GW identity; moreover, the HSS finds out that the PDN GW identity selected by the UE based on the same APN changes, and it sends the updated PDN GW identity to the access gateway of the WLAN via the AAA server, in turn, this causes an exception process in the WLAN network; whereas, when the UE accesses via the 3GPP access system firstly and later accesses via the WLAN access system, the HSS finds out that the PDN GW identity selected by the UE based on the same APN changes, it sends the changed PDN GW identity to the MME, in turn, this causes an exception process in the 3GPP network.

In addition, the Universal Mobile Telecommunications System (UMTS) also support interworking with the non-3GPP system; the difference is, the Serving General Packet Radio Service Support Node (SGSN) is used to replace the MME and the S-GW, and the Gateway General Packet Radio Service Supporting Node (GGSN) is used to replace the P-GW.

Therefore, the problem of the UE that does not support the handover accessing to the mobile core network via the UMTS and the non-3GPP system simultaneously also exists.

SUMMARY

An embodiment of the present document provides a method for updating identity information of a packet gateway, an information transmission method, an authentication, authorization, and accounting (AAA) server, a trusted non-3GPP access network element and a packet gateway, to solve the problem of network anomalies caused by a UE accessing to a mobile core network via a 3GPP system and the non-3GPP system simultaneously.

An embodiment of the present document provides a method for updating identity information of a packet gateway, comprising:

a decision-making network element receiving a message which carries user equipment (UE) capability indication information and is sent by an information transmission network element; and the decision network element deciding whether to update the identity information of the packet gateway or not according to the UE capability indication information carried in the message and/or local information Alternatively, the UE capability indication information is information about difference between different versions of the UE, requested access point name (APN) information, request type, the type of service requested by the UE, or the type of packet data network (PDN).

Alternatively, the step of the decision-making network element receiving the message which carries the UE capability indication information and is sent by the information transmission network element comprises:

an authentication, authorization, and accounting (AAA) server receiving an Extensible Authentication Protocol (EAP) authentication message which carries the UE capability indication information and is sent by a trusted non-3GPP access network (TNAN) network element; or the AAA server receiving a packet gateway address update message which carries the UE capability indication information and is sent by the packet gateway, wherein, the packet gateway acquires the UE capability indication information from a session creation request message or a proxy binding update message sent by the TNAN network element; or the packet gateway receiving the session creation request message or the proxy binding update message which is transmitted by the TNAN network element and carries the UE capability indication information.

Alternatively, the packet gateway is a packet data network gateway (P-GW) or a gateway general packet radio service support node (GGSN).

Alternatively, when the decision-making network element is the AAA server, the step of the decision-making network element deciding whether to update the identity information of the packet gateway or not according to the UE capability indication information carried in the message and/or the local information comprises:

when the AAA server determines that the current UE is a R12 UE and in a handover procedure according to the UE capability indication information and/or the local information, do not update the address of the P-GW or the GGSN to the Home Subscriber Server (HSS);

when the AAA server determines that the current UE is a R12 UE and accesses for the first time according to the UE capability indication information and/or the local information, update the address of the P-GW or the GGSN to the HSS; or when the AAA server determines that the current UE is a R11 UE according to the UE capability indication information and/or the local information, do not update the address of the P-GW or the GGSN to the HSS;

when the decision-making network element is the packet gateway, the step of the decision-making network element deciding whether to update the identity information of the packet gateway or not according to the UE capability indication information carried in the message and/or the local information comprises:

when the packet gateway determines that the current UE is a R12 UE and in the handover procedure according to the UE capability indication information and/or the local information, do not update the address of the packet gateway to the HSS or the AAA server;

when the packet gateway determines that the current UE is a R12 UE and accesses for the first time according to the UE the capability indication information and/or the local information, update the address of the packet gateway to the HSS or the AAA server; or when the packet gateway determines that the current UE is a R11 UE according to the UE capability indication information and/or the local information, do not update the address of the packet gateway to the HSS or the AAA server.

Alternatively, after the step of the decision-making network element receiving the message which carries the UE capability indication information and is sent by the information transmission network element, the method further comprises:

the AAA server sending the UE capability indication information to the HSS.

The embodiment of the present document further provides an information transmission method, comprising:

an information transmission network element acquiring a user equipment (UE) capability indication information;

the information transmission network element sending the message carrying the UE capability indication information to the decision-making network element.

Alternatively, the UE capability indication information is the information about difference between different versions of the UE, the requested access point name (APN) information, the request type, the type of service requested by the UE, or the type of the packet data network (PDN).

Alternatively, the step of the information transmission network element sending a message carrying the UE capability indication information to the decision-making network element comprises:

the trusted non-3GPP access network (TNAN) network element sending an Extensible Authentication Protocol (EAP) authentication message carrying the UE capability indication information to the authentication, authorization, and accounting (AAA) server; or the TNAN network element sending the packet gateway a session creation request message or a proxy binding update message carrying the UE capability indication information.

Alternatively, the packet gateway is a packet data network gateway (P-GW) or a gateway general packet radio service support node (GGSN).

Alternatively, after the step of the TNAN network element sending the packet gateway the proxy binding update message or the session creation request message carrying the UE capability indication information, the method further comprises:

the packet gateway sending the AAA server a packet gateway address update message carrying the UE capability indication information.

The embodiment of the present document further provides an authentication, authorization, and accounting (AAA) server, comprising:

a receiving module, configured to: receive an extensible authentication protocol (EAP) authentication message which is sent by a trusted non-3GPP access network (TNAN) network element and carries a user equipment (UE) capability indication information; alternatively, receive a packet gateway address update message which is sent by the packet gateway and carries the UE capability indication information; and a decision-making module, configured to: decide whether to update the identity information of the packet gateway or not according to the UE capability indication information and/or local information.

Alternatively, the decision-making module is configured to: when determining that the current UE is a R12 UE and in a handover procedure according to the UE capability indication information and/or the local information, do not update the address of a packet data network gateway (P-GW) or a gateway general packet radio service support node (GGSN) to a home subscriber server (HSS); when determining that the current UE is a R12 UE and accesses for the first time according to the UE capability indication information and/or the local information, then update the address of the P-GW or the GGSN to the HSS; when determining that the current UE is a R11 UE according to the UE capability indication information and/or the local information, do not update the address of the P-GW or the GGSN to the HSS.

The embodiment of the present document further provides a packet gateway, comprising:

a receiving module, configured to: receive a proxy binding update message or a session creation request message which carries a user equipment (UE) capability indication information and is sent by a trusted non-3GPP access network (TNAN) network element; and a decision-making module, configured to: decide whether to update identity information of the packet gateway or not according to the UE capability indication information and/or local information.

Alternatively, the decision-making module is configured to:

when determining that the current UE is a R12 UE and in a handover procedure according to the UE capability indication information and/or the local information, do not update the address of the packet gateway to a home subscriber server (HSS) or an Authentication, Authorization, and Accounting (AAA) server;

when determining that the current UE is a R12 UE and accesses for the first time according to the UE capability indication information and/or the local information, update the address of the packet gateway to the HSS or the AAA server; or when determining that the current UE is a R11 UE according to the UE capability indication information and/or the local information, do not update the address of the packet gateway to the HSS or the AAA server.

Alternatively, the packet gateway further comprises:

a sending module, which is configured to: send a packet gateway address update message carrying the UE capability indication information to the AAA server.

Alternatively, the packet gateway is a packet data network gateway (P-GW) or a gateway general packet radio service support node (GGSN).

The embodiment of the present document further provides a trusted non-3GPP access network (TNAN) network element, comprising:

an acquiring module, configured to: obtain the user equipment (UE) capability indication information; and a sending module, configured to: send an Extensible Authentication Protocol (EAP) authentication message carrying the UE capability indication information to an authentication, authorization, and accounting (AAA) server; or, send the packet gateway a proxy binding update message or a session creation request message carrying the UE capability indication information.

In the embodiment of the present document, it is able to distinguish the R11 UE and the R12 UE, and to ensure to support both the R12 UE and the R11 UE normally accessing to the 3GPP core network through the 3GPP access system and the non-3GPP access system simultaneously.

PREFERRED EMBODIMENTS OF THE PRESENT DOCUMENT

Figure 1:
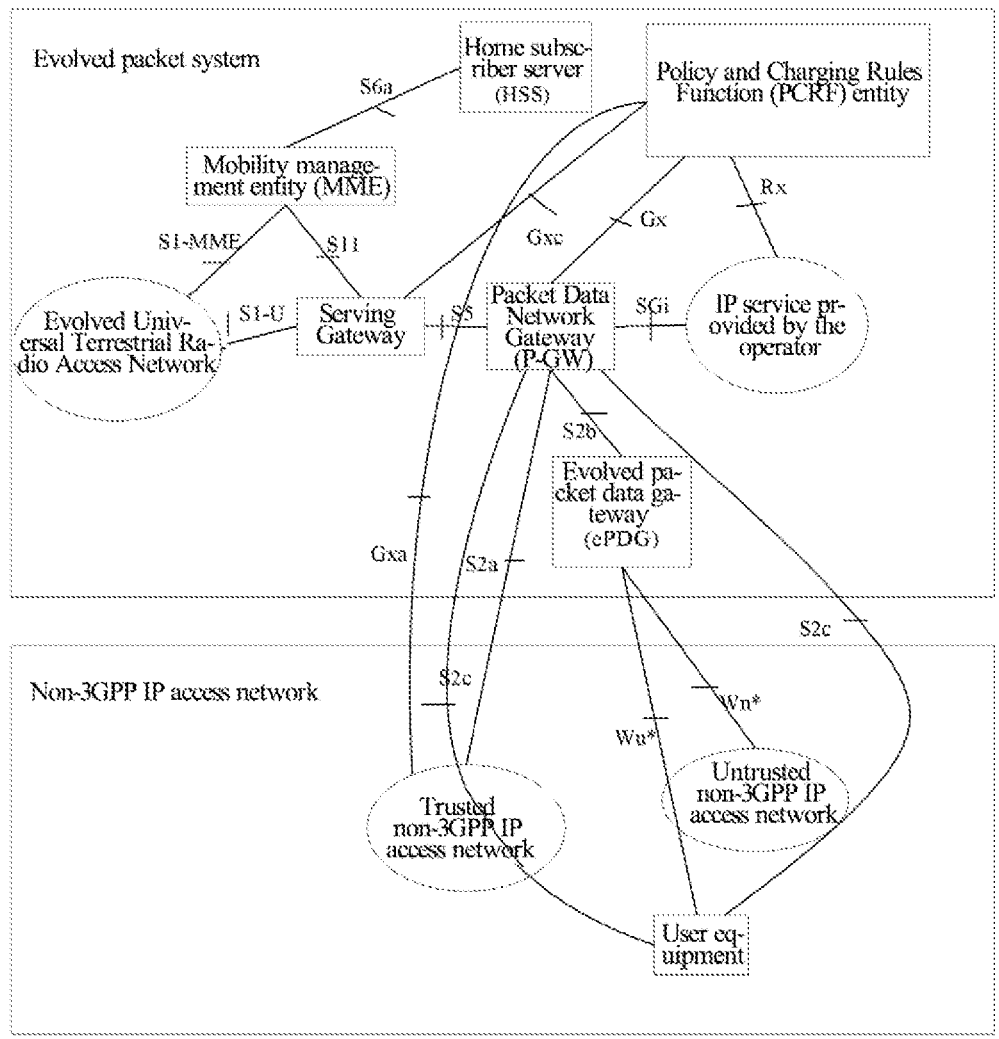
FIG. 1 is a network structural diagram of the 3GPP network interworking with the non-3GPP network in the related art.
Figure 2:
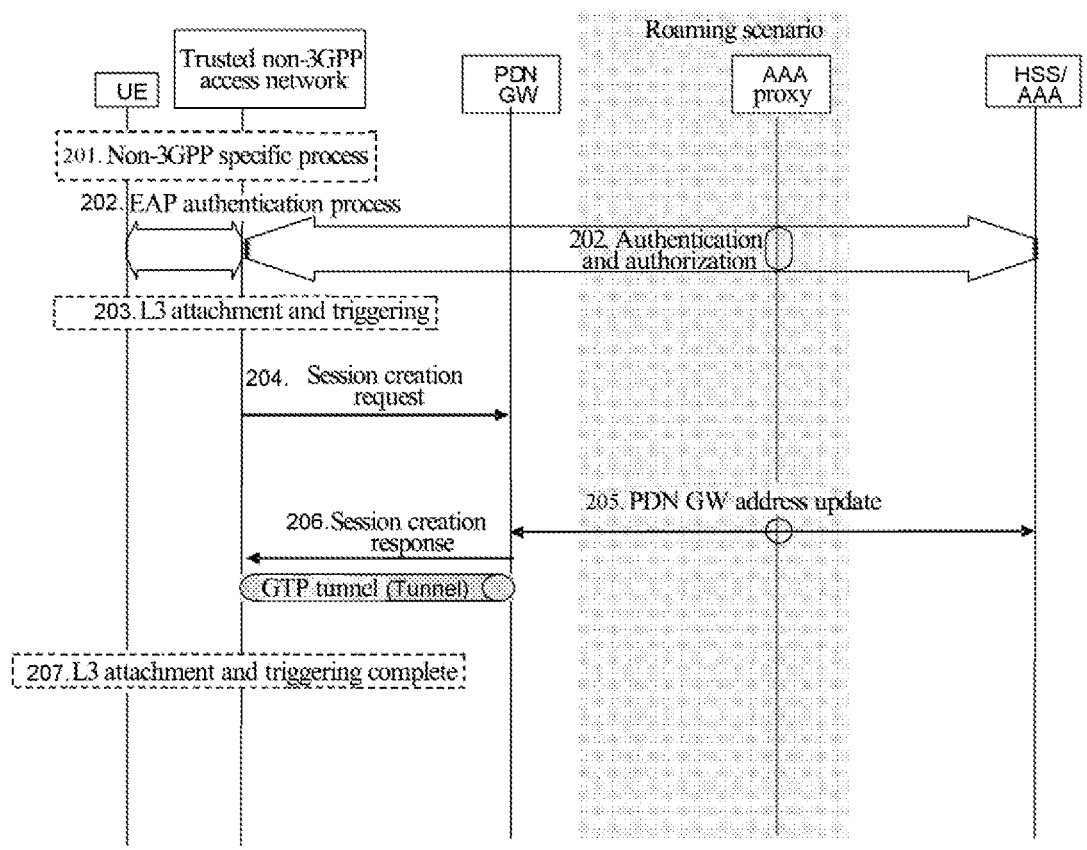
FIG. 2 is a signaling flow chart of the UE accessing to the EPC through a trusted WLAN in the related art.

Hereinafter in conjunction with the accompanying drawings, the embodiments of the present document will be described in detail. It should be noted that, in the case of no conflict, the embodiments and features in the embodiments of the present application may be arbitrarily combined with each other.

An embodiment of the present document provides a method for updating identity information of a packet gateway, and the method is applicable to a UE accessing to the 3GPP mobile core network through the non-3GPP system, and the method describes from the side of the decision-making network element, and the method comprises the following steps.

Step 11, the decision-making network element receives a message which is sent by the information transmission network element and carries the UE capability indication information.

The abovementioned decision-making network element can be an AAA server, a PDN GW or a GGSN, the abovementioned information transmission network element can be a TNAN or a PDN GW; the abovementioned UE capability indication information is the information about difference between the different versions of the UE, the requested Access Point Name (APN) information, the request type, the type of service requested by the UE, or the type of packet data network (PDN).

Step 12, the decision-making network element decides whether to update the identity information of the packet gateway or not according to the UE capability indication information carried in the message and/or the local information.

The embodiment of the present document further provides an information transmission method, and the embodiment will be described from the side of the information transmission network element, and the method comprises the following steps.

Step 21, the information transmission network element acquires the UE capability indication information.

Step 22, the information transmission network element sends a message carrying the UE capability indication information to the decision-making network element.

The step 22 comprises: the trusted non-3GPP access network (TNAN) network element sending an EAP authentication message carrying the UE capability indication information to the authentication, authorization, and accounting (AAA) server; alternatively, the TNAN network element sends the packet gateway a proxy binding update message or a session creation request message carrying the UE capability indication information, wherein the packet gateway is a packet data network gateway (P-GW) or a gateway general packet radio service support node (GGSN); or the packet gateway sends the authentication, authorization, and accounting (AAA) server a packet gateway address update message carrying the UE capability indication information.

The TNAN network element can be a TNAN gateway.

from the perspective of the decision-making network element and the information transmission network element interacting with each other, aiming to the PDN GW and the AAA server, how to obtain the UE capability indication information and to decide whether to update the PDN GW identity or not according to this information will be described in the following.

The First Embodiment

Figure 3:
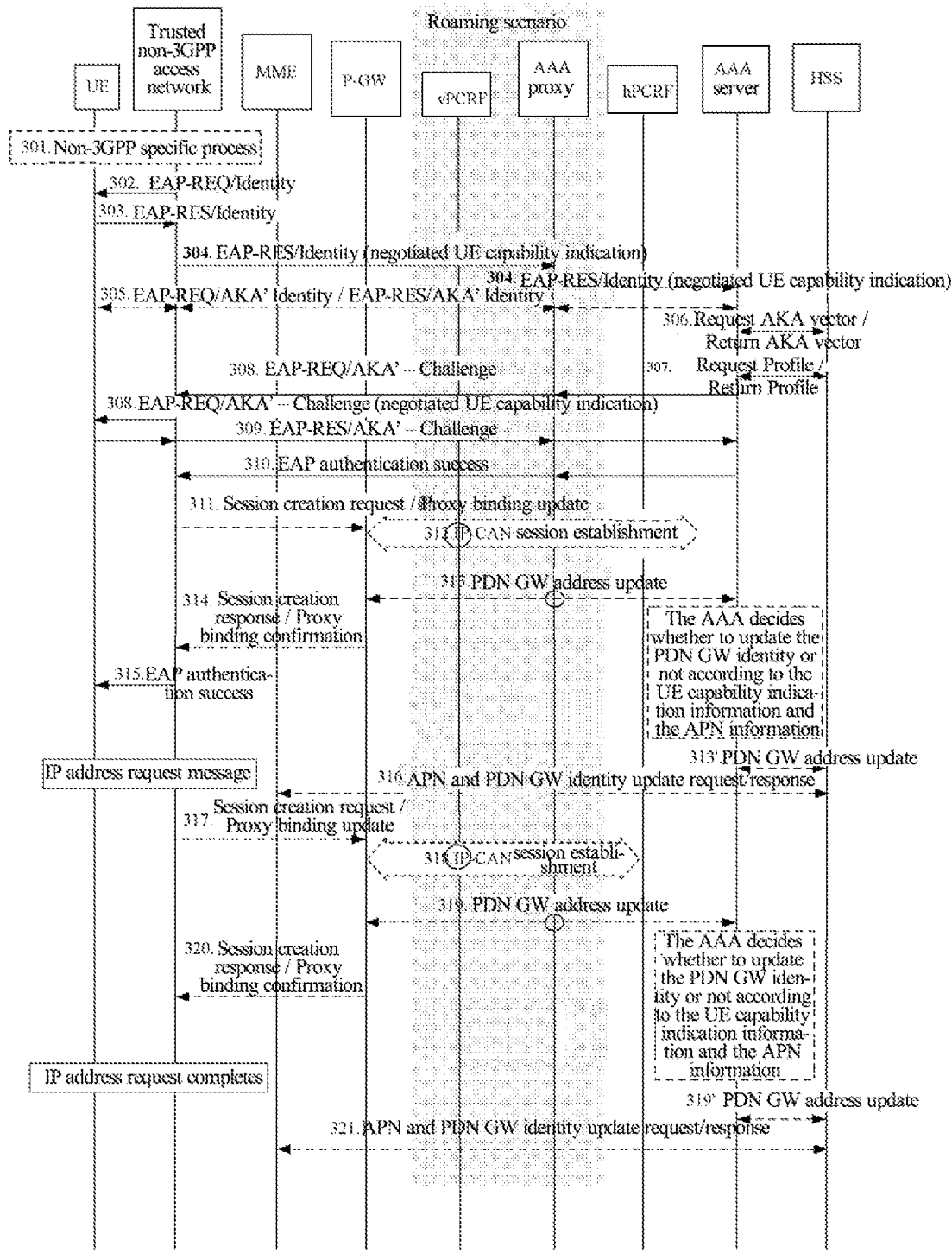
FIG. 3 is a signaling flow chart of updating the identity information of a packet gateway in accordance with a first embodiment of the present document.

In this embodiment, when the UE accesses to the EPC via the trusted non-3GPP access system, the trusted non-3GPP access gateway sends the UE capability indication information to the AAA server via the EAP authentication message; the application scenario is: the R11 UE and the R12 UE access to the EPC via the WLAN access system. The AAA server decides whether to perform the operation of updating the PDN GW identity or not. The specific process can refer to FIG. 3, and the process comprises the following steps.

Step 301, the UE may already access to the 3GPP EPC via the 3GPP access system; the UE and the trusted non-3GPP access gateway network element perform the non-3GPP specific processes, such as link establishment, access authentication, and so on.

Steps 302-304, the trusted non-3GPP access gateway works as an EAP authenticator and triggers the EAP authentication process to the UE. If the AAA server decides whether to update the PDN GW identity or not, the AAA server needs to acquire the UE capability indication information, therefore, the trusted non-3GPP access gateway can acquire the UE capability indication information, and the UE capability indication information can implicitly represent its capacity through the requested APN information, the request type, the type of service requested by the UE, or the type of PDN. For example, if the TNAN receives any of the preceding information transmitted by the UE, the UE is a R12 UE; if the TNAN does not receive any of the abovementioned information transmitted by the UE, the UE is a R11 UE. Alternatively, the UE explicitly transmits indication information, such as R11 UE or R12 UE, that is capable of describing the difference between the R11 UE (do not support processes such as transmitting the APN, handover, and so on) and the R12 UE (support processes such as transmitting the APN, handover, and so on) to explicitly represent its capability.

After the TNAN acquires the UE capability indication information, combined with the local capability, it gives a negotiated UE capability indication information, for example, if the UE supports transmitting the APN, handover, and other processes, but the TNAN does not support receiving the APN, and additional PDN connection, handover, and so on. The negotiated UE capability indication information is represented as not supporting receiving the APN, the additional PDN connection, handover, and so on; if the UE does not support transmitting the APN, the additional PDN connection, handover, and other processes, but the TNAN supports receiving the APN, the additional PDN connection, handover and other processes, then the negotiated UE capability indication information is represented as not supporting receiving the APN, the additional PDN connection, handover, and other processes. The specific definition is the same as the abovementioned UE capability indication information, and is transmitted to the 3GPP AAA server via the EAP authentication message. Wherein, the request type comprises the attachment type or handover type, and the type of service requested by the UE is service distribution or accessing to the EPC.

Specifically, the following operations can be performed.

1) the UE carries the UE capability indication information in the EAP request (EAP-RES)/Identity message and sends it to the trusted non-3GPP access gateway, and the trusted non-3GPP access gateway decides whether to allow the UE to switch or not according to the capability indication information carried by the UE and the local strategies, and provides a negotiated UE capability indication information, and the specific representation method is the same as above described.

2) the trusted non-3GPP access gateway sends its supporting UE capability indication information to the UE via the EAP-REQ/Identity message, and the UE decides whether to perform the UE handover or not according to its own capability indication information and the UE capability indication information supported by the trusted non-3GPP access gateway, and provides a negotiated UE capability indication information, and the specific representation method is the same as above described. Then, the UE capability indication information is carried in the EAP-RES/Identity message and sent to the trusted non-3GPP access gateway.

Then, the trusted non-3GPP access gateway encapsulates the EAP-RES/Identity message in the diameter (Diameter)/

Remote Authentication Dial In User Service (Radius) message, and sends it to the AAA server. Wherein, the negotiated UE capability indication information can be included in the Diameter/Radius message or the EAP-RES/Identity message in the Diameter/Radius message.

Step 305 an authentication and key agreement (AKA') identity request/response operation is performed between the UE and the AAA server.

Steps 306-307, the AAA server requests the HSS for subscription information and parameters which are needed for the EAP authentication. The HSS returns a message to the AAA server, and this message may comprise: the PDN GW address associated with the APN, and the related information selected by the APN and the PDN GW.

Alternatively, the AAA server can transmit the negotiated UE capability indication information to the HSS, and the HSS can perform the following operations according to the information and/or other local information.

1) If it is a R12 UE, and the HSS does not store the PDN GW address associated with the APN, return the related information selected by the APN and the PDN GW to the AAA server; otherwise, return the PDN GW address associated with the APN.

2) If it is a R11 UE, do not send the AAA server the PDN GW address selected when previously accessing to the 3GPP access system, but return the related information selected by the APN and the PDN GW to the AAA server.

Subsequently, when the trusted non-3GPP access gateway selects the PDN GW, if the message returned by the HSS comprises: the PDN GW address associated with the APN and the related information selected by the APN and the PDN GW, then decide according to the negotiated UE capability indication information whether to use the PDN GW address associated with the APN or select a new PDN GW address through the Domain Name Server (DNS); if the message returned by the HSS comprises only the PDN GW address associated with the APN, or comprise only the related information selected by the APN and the PDN GW, it illustrates that the HSS has made an appropriate decision according to the UE capability indication information, and the trusted non-3GPP access gateway does not need to make further decisions.

Steps 308-310, other processes for the EAP are completed between the UE and the AAA server.

Mode one: the EAP authentication success message is used to trigger the trusted non-3GPP access gateway to establish a session to the PDN GW.

Step 311, after the trusted non-3GPP access gateway receives the EAP authentication success message, it sends a session creation request message or a proxy binding update message to the PDN GW.

Step 312, the IP Connectivity Access Network (IP-CAN) session establishment operation is executed between the PDN GW and the Policy And Charging Rules Function (PCRF) entity.

Step 313, the PDN GW updates the PDN GW address to the HSS through the AAA server; after the AAA server receives the PDN GW address update message sent by the PDN GW, it decides whether to perform a PDN GW address updating operation to the HSS or not according to the negotiated UE capability indication information and/or the local information. The specific operation is described as follows.

1) If the UE is a R12 UE and in the handover process, do not update the PDN GW address to the HSS; if the UE is a R12 UE and accesses for the first time, update the PDN GW address to the HSS, that is, perform step 313'.

2) If the UE is a RH UE, do not update the PDN GW address to the HSS.

Step 314, the PDN GW sends a session creation response or a proxy binding confirmation message to the trusted non-3GPP access gateway.

Step 315, the non-3GPP access gateway sends an EAP authentication success message to the UE.

Step 316, if performing the step 313', and the HSS stores the PDN GW address associated with the APN, but the address is different from the PDN GW address updated in step 313', then perform this step, and the HSS performs a PDN GW identity updating operation to the MME which previously establishes a connection with the HSS.

It should be noted that the abovementioned steps 314 and 316 do not have a precedence order.

Mode two: trigger the trusted non-3GPP access gateway to establish a session to the PDN GW through an IP address request message.

Step 317, after the trusted non-3GPP access gateway receives the IP address request message, it sends a session creation request message or a proxy binding update message to the PDN GW, and the message comprises the negotiated UE capability indication information.

Steps 318-321 are the same as steps 312-316, except for step 315.

When the 3GPP network is UMTS, the SGSN replaces the MME in the present embodiment, and the GGSN replaces the PDN GW in the present embodiment, while the functions to be enhanced are identical.

The Second Embodiment

Figure 4:
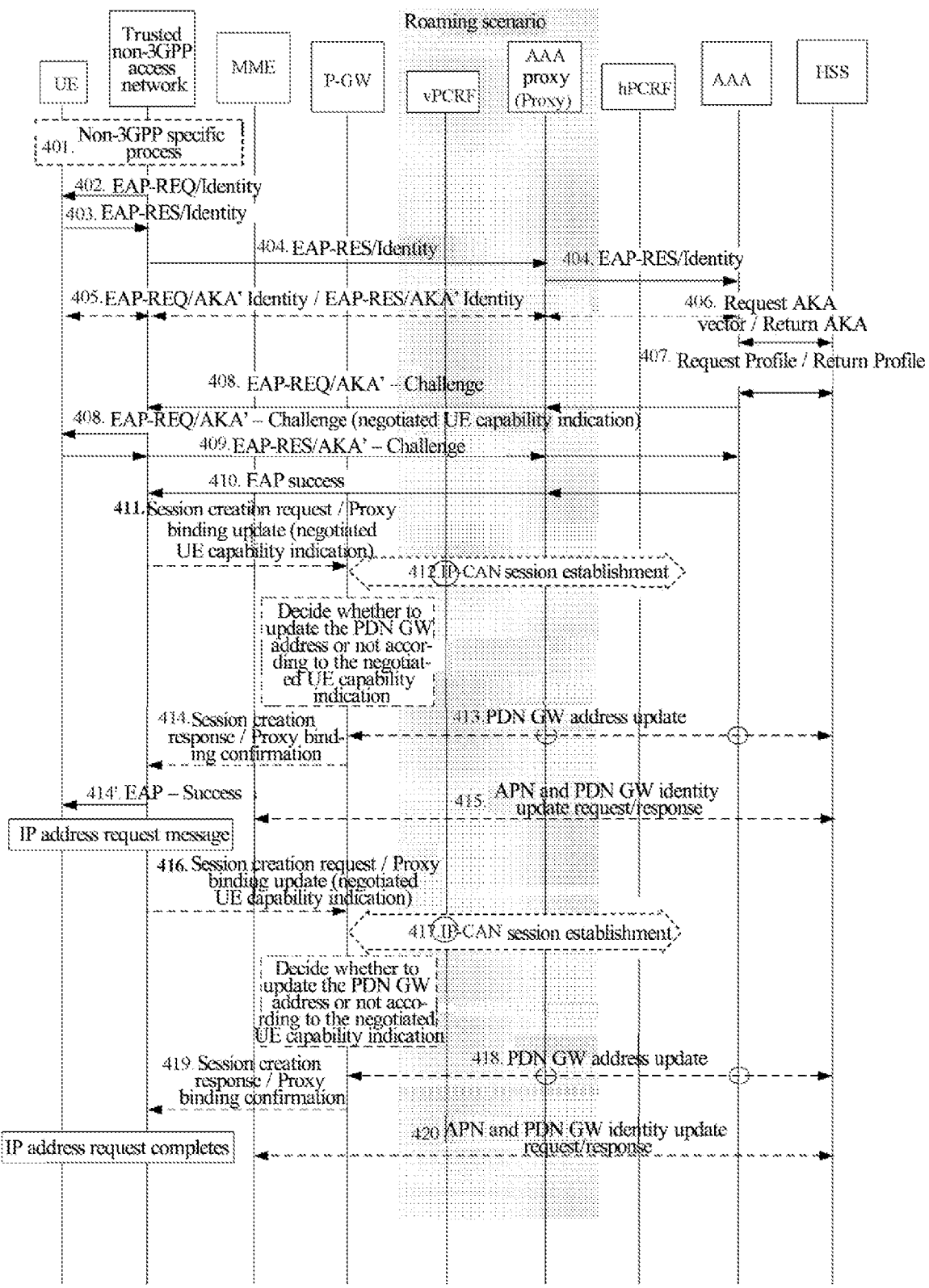
FIG. 4 is a signaling flow chart of updating the identity information of a packet gateway in accordance with a second embodiment of the present document.

In this embodiment, when the UE accesses to the EPC via the trusted non-3GPP access system, the trusted non-3GPP access gateway sends the UE capability indication information to the AAA server via the EAP authentication message; the application scenario is: the R11 UE and the R12 UE access to the EPC via the WLAN access system. The PDN GW decides whether to perform the operation of updating the PDN GW identity or not. The specific process can refer to FIG. 4, and the process comprises the following steps.

Step 401, the UE may already access to the 3GPP EPC via the 3GPP access system; the UE and the trusted non-3GPP access gateway network element perform the non-3GPP specific processes, such as link establishment, access authentication, and so on.

Steps 402-404, the trusted non-3GPP access gateway works as an EAP authenticator and triggers the EAP authentication process to the UE.

Then, the trusted non-3GPP access network gateway encapsulates the EAP-RES/Identity message in the Diameter/Radius message and sends it to the AAA server.

Wherein, the definition and acquisition mode of the trusted non-3GPP access network gateway acquiring the UE capability indication information can refer to the related description in the first embodiment. After the TNAN acquires the UE capability indication information, combined with the local capability, it gives the negotiated UE capability indication information, specifically it is the indication information such as the R11 UE or the R12 UE that can distinguish the RH UE (do not support the processes such as transmitting the APN, handover, and so on) and the R12 UE (support the processes such as transmitting the APN, handover, and so on) to explicitly represent its capability.

Step 405, the authentication and key agreement (AKA') identity request/response operation is performed between the UE and the AAA server.

Steps 406-407, the AAA server requests the HSS for the subscription information and the parameters that are needed for the EAP authentication. The message returned by the HSS to the AAA server may comprise: the PDN GW address associated with the APN (if the UE already accesses to the 3GPP core network through the 3GPP access system previously), and the related information selected by the APN and the PDN GW.

Subsequently, when the trusted non-3GPP access gateway selects the PDN GW, if the message returned by the HSS comprises: the PDN GW address associated with the APN and the related information selected by the APN and the PDN GW, then it decides according to the negotiated UE capability indication information whether to use the PDN GW address associated with the APN, or select a new PDN GW address through the Domain Name Server (DNS); if the message returned by the HSS comprises only the PDN GW address associated with the APN, or comprise only the related information selected by the APN and the PDN GW, it illustrates that the HSS already makes the appropriate decision according to the UE capability indication information, and the trusted non-3GPP access gateway does not need to make further decisions.

Steps 408-410, the EAP and other processes are completed between the UE and the AAA server.

Mode one: the EAP authentication success message is used to trigger the trusted non-3GPP access gateway to establish a session to the PDN GW.

Step 411, after the trusted non-3GPP access gateway receives the EAP authentication success message, it sends a session creation request message or a proxy binding update message to the PDN GW, and the message comprises the negotiated UE capability indication information.

Step 412, the IP Connectivity Access Network (IP-CAN) session establishment operation is executed between the PDN GW and the PCRF entity.

Step 413, the PDN GW decides whether to update the PDN GW address to the HSS through the AAA server or not according to the negotiated UE capability indication information and/or other local information. The specific operation is described as follows.

1) If the UE is a R12 UE and in the handover process, do not update the PDN GW address to the HSS/the AAA server; if the UE is a R12 UE and accesses for the first time, update the PDN GW address to the HSS/the AAA server, that is, perform step 413.

2) If the UE is a R11 UE, do not update the PDN GW address to the HSS/the AAA server.

Step 414, the PDN GW sends a session creation response or a proxy binding confirmation message to the trusted non-3GPP access gateway.

Step 414', the non-3GPP access gateway sends an EAP authentication success message to the UE.

Step 415, if performing the step 413, and the HSS stores the PDN GW address associated with the APN, but the address is different from the PDN GW address updated in step 313', then perform this step, and the HSS performs a PDN GW identity updating operation to the MME which establishes a connection with the HSS previously.

It needs to be noted that the abovementioned steps 414 and 415 do not have a precedence order.

Mode two: trigger the trusted non-3GPP access gateway to establish a session to the PDN GW through the IP address request message.

Step 416, after the UE receives the EAP authentication success message, it sends an IP address request message to the trusted non-3GPP access network gateway. After the trusted non-3GPP access network gateway receives the IP address request message, it sends a session creation request message or a proxy binding update message to the PDN GW, and the message comprises the negotiated UE capability indication information.

Steps 417-420: the same as steps 412-415, except of step 414'.

When the 3GPP network is UMTS, the SGSN replaces the MME in the present embodiment, and the GGSN replaces the PDN GW in the present embodiment, while the functions to be enhanced are identical.

The Third Embodiment

Figure 5:
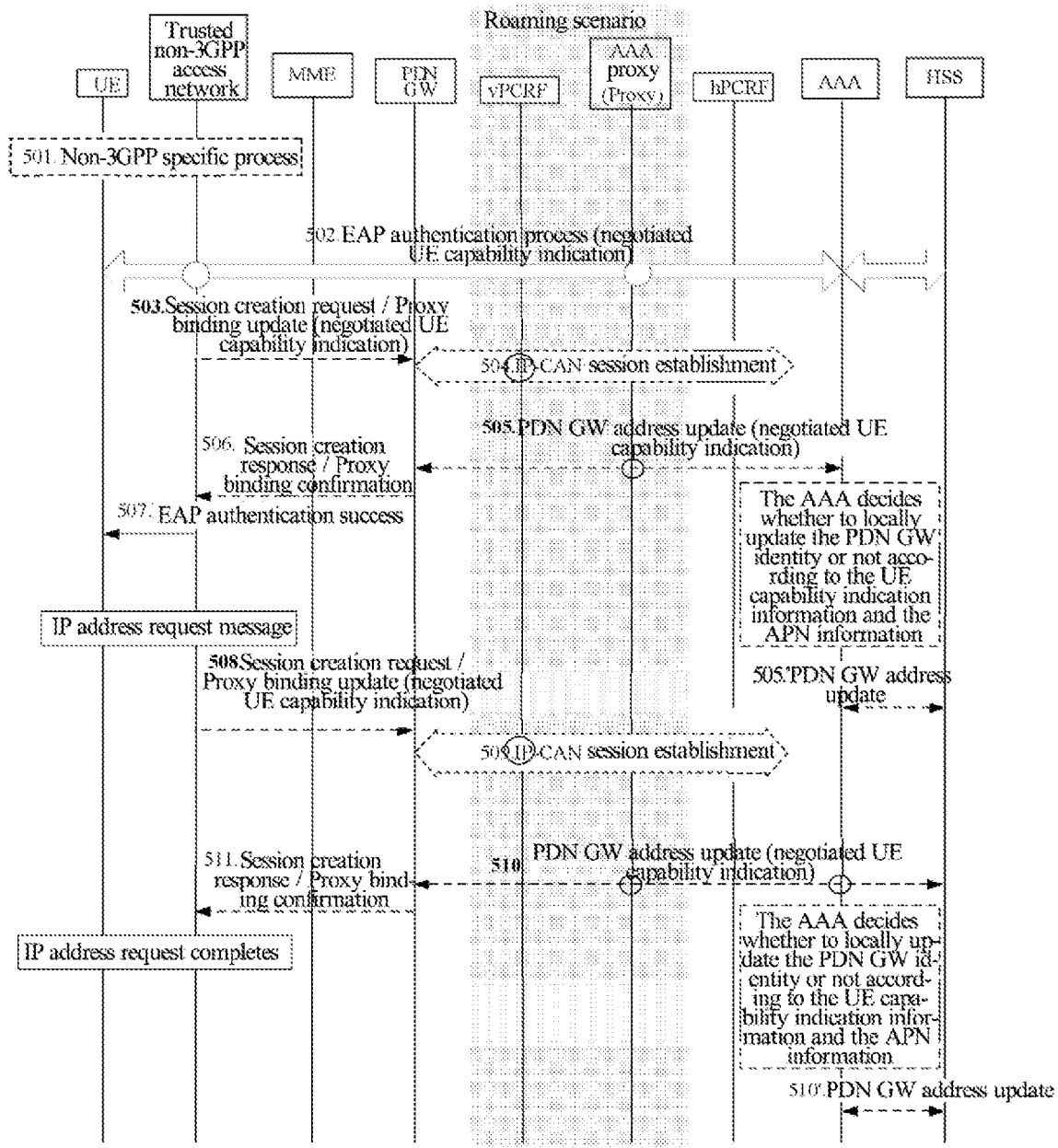
FIG. 5 is a signaling flow chart of updating the identity information of a packet gateway in accordance with a third embodiment of the present document.

In this embodiment, when the UE accesses to the EPC via the trusted non-3GPP access system, the trusted non-3GPP access gateway sends the UE capability indication information to the AAA server via the PDN GW; the application scenario is: the R11 UE and the R12 UE access to the EPC via the WLAN access system. The AAA server decides whether to perform the operation of updating the PDN GW identity or not. The specific process can refer to FIG. 5, and the process comprises the following steps.

Step 501, the UE and the trusted non-3GPP access gateway network element perform the non-3GPP specific processes, such as link establishment, access authentication, and so on.

Steps 502, the UE processes the EAP authentication process, wherein, in the authentication process, the trusted non-3GPP access network gateway acquires the UE capability indication information, and the trusted non-3GPP access network gateway decides the negotiated UE capability indication information according to the UE capability indication information and the local capability.

Wherein, the acquisition and definition of the UE capability indication information and the negotiated UE capability indication information can refer to the related description in the second embodiment.

Subsequently, when the trusted non-3GPP access gateway selects the PDN GW, if the message returned by the HSS comprises: the PDN GW address associated with the APN and the related information selected by the APN and the PDN GW, then decide according to the negotiated UE capability indication information whether to use the PDN GW address associated with the APN, or select a new PDN GW address through the Domain Name Server (DNS); if the message returned by the HSS comprises only the PDN GW address associated with the APN, or comprise only the related information selected by the APN and the PDN GW, it illustrates that the HSS already makes the appropriate decision according to the UE capability indication information, and the trusted non-3GPP access gateway does not need to make further decisions.

In the following, these two modes are used to respectively describe the process of the trusted non-3GPP access network gateway transmitting the negotiated UE capability indication information to the AAA server.

Mode one: the EAP authentication success message is used to trigger the trusted non-3GPP access gateway to establish a session to the PDN GW.

Step 503: the trusted non-3GPP access gateway sends a session creation request message or a proxy binding update message to the PDN GW, and the message comprises the negotiated UE capability indication information.

Step 504: the IP-CAN session establishment operation is performed between the PDN GW and the PCRF entity.

Step 505-505', the PDN GW sends the PDN GW address update message to the HSS through the AAA server, and the message comprises the negotiated UE capability indication information; after the AAA server receives the PDN GW address update message sent by the PDN GW, it decides whether to perform a PDN GW address updating operation to the HSS or not according to the negotiated UE capability indication information and/or other local information. The specific operation is described as follows.

1) If the UE is a R12 UE and in the handover procedure, do not update the PDN GW address to the HSS; if the UE is a R12 UE and accesses for the first time, update the PDN GW address to the HSS, that is, perform step 505'.

2) If the UE is a R11 UE, do not update the PDN GW address to the HSS.

Step 506, after the trusted non-3GPP access gateway receives the IP address request message, it sends the PDN GW the session creation request message or the proxy binding update message, and the message comprises the negotiated UE capability indication information.

Step 507, the non-3GPP access gateway sends an EAP authentication success message to the UE.

Mode two: the trusted non-3GPP access gateway is triggered to establish a session to the PDN GW via the IP address request message.

Steps 508-511, after the UE receives the EAP authentication success message, it sends an IP address request message to the trusted non-3GPP access gateway. After the trusted non-3GPP access gateway receives the IP address request message, it sends a session creation request message or a proxy binding update message to the PDN GW, and the message comprises the negotiated UE capability indication information; steps 509-511 are the same as steps 504-506.

When the 3GPP network is the UMTS, the SGSN replaces the MME in the present embodiment, and the GGSN replaces the PDN GW in the present embodiment, while the functions to be enhanced are identical.

In the abovementioned method for updating the identity information of the packet gateway, according to the received UE capability indication information, the R11 UE and the R12 UE can be distinguished, and the UE profile is used to decide whether to update the identity information of the packet gateway or not, so as to support both the R11 UE and the R12 UE normally accessing to the 3GPP core network via the 3GPP access system and the non-3GPP access system simultaneously.

Figure 6:
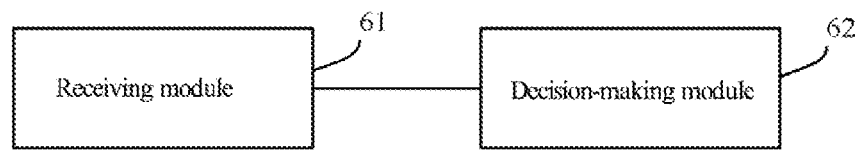
FIG. 6 is a schematic diagram of the structure of an AAA server in accordance with an embodiment of the present document.

FIG. 6 is a schematic diagram of the structure of an AAA server in accordance with an embodiment of the present document, and the AAA server comprises receiving module 61 and decision-making module 62, wherein:

the receiving module 61 is configured to: receive an extensible authentication protocol (EAP) authentication message which is sent by the trusted non-3GPP access network (TNAN) network element and carries the user equipment (UE) capability indication information; alternatively, receive the packet gateway address update message which is sent by the packet gateway and carries the UE capability indication information; and the decision-making module 62 is configured to: decide whether to update the identity information of the packet gateway or not according to the UE capability indication information and/or the local information.

Alternatively, the decision-making module 62 is configured to: when determining that the current UE is a R12 UE and in the handover procedure according to the UE capability indication information and/or the local information, do not update the address of the P-GW or the GGSN to the home subscriber server (HSS); when determining that the current UE is a R12 UE and accesses for the first time according to the UE capability indication information and/or the local information, then update the address of the P-GW or the GGSN to the HSS; when determining that the current UE is a R11 UE according to the UE capability indication information and/or the local information, do not update the address of the P-GW or the GGSN to the HSS.

With the abovementioned AAA server, the R11 UE and the R12 UE can be distinguished according to the received UE capability indication information, and the UE profile can be used to decide whether to update the identity information of the packet gateway or not, so as to support both the R11 UE and the R12 UE normally accessing to the 3GPP core network via the 3GPP access system and the non-3GPP access system simultaneously.

Figure 7:
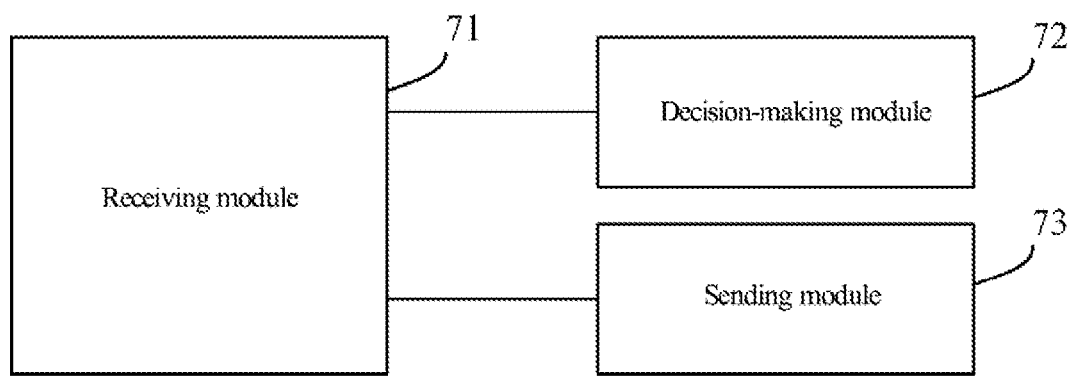
FIG. 7 is a schematic diagram of the structure of a packet gateway in accordance with an embodiment of the present document.

FIG. 7 is a schematic diagram of the structure of a packet gateway in accordance with an embodiment of the present document, and the packet gateway comprises receiving module 71 and decision-making module 72, wherein:

the receiving module 71 is configured to: receive a session creation request message or a proxy binding update message which carries the user equipment (UE) capability indication information and is sent by the trusted non-3GPP access network (TNAN) network element; and the decision-making module 72 is configured to: decide whether to update the identity information of the packet gateway or not according to the UE capability indication information and/or the local information.

Wherein, the decision-making module 72 is configured to: when determining that the current UE is a R12 UE and in the handover procedure according to the UE capability indication information and/or the local information, do not update the address of the packet gateway to the home subscriber server (HSS) or the Authentication, Authorization, and Accounting (AAA) server; when determining that the current UE is a R12 UE and accesses for the first time according to the UE capability indication information and/or the local information, update the address of the packet gateway to the HSS or the AAA server; alternatively, when determining that the current UE is a R11 UE according to the UE capability indication information and/or the local information, do not update the address of the packet gateway to the HSS or the AAA server.

Furthermore, the abovementioned packet gateway further comprises: sending module 73, and the sending module 73 is configured to: send a packet gateway address update message carrying the UE capability indication information to the AAA server.

The abovementioned packet gateway is a packet data network gateway (P-GW) or a gateway general packet radio service support node (GGSN).

With the abovementioned packet gateway, the R11 UE and the R12 UE can be distinguished according to the received UE capability indication information, and the UE profile can be used to decide whether to update the identity information of the packet gateway or not, so as to support both the R11 UE and the R12 UE normally accessing to the 3GPP core network via the 3GPP access system and the non-3GPP access system simultaneously.

Figure 8:
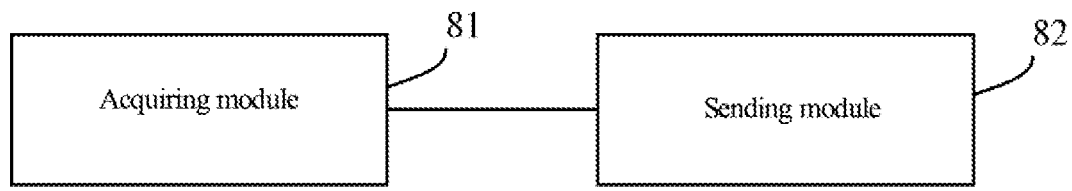
FIG. 8 is a schematic diagram of the structure of a THAN network element in accordance with an embodiment of the present document.

FIG. 8 is a schematic diagram of the structure of a TNAN network element in accordance with an embodiment of the present document, and the TNAN network element comprises acquiring module 81 and sending module 82, wherein:

the acquiring module 81 is configured to: acquire the user equipment (UE) capability indication information; and the sending module 82 is configured to: send an EAP authentication message carrying the UE capability indication information to the authentication, authorization, and accounting (AAA) server; or, send a proxy binding update message or a session creation request message carrying the UE capability indication information to the packet gateway.

The packet gateway is a packet data network gateway (P-GW) or a gateway general packet radio service support node (GGSN).

The abovementioned TNAN network element is the abovementioned TNAN gateway.

With the abovementioned TNAN network element, by sending the UE capability indication information to the AAA server or the packet gateway, the AAA server or the packet gateway can distinguish the R11 UE and the R12 UE according to the received UE capability indication information, and decide whether to update the identity information of the packet gateway or not according to the UE profile, so as to support both the R11 UE and the R12 UE normally accessing to the 3GPP core network via the 3GPP access system and the non-3GPP access system simultaneously.

A person of ordinary skill in the art can understand that all or some of the steps in the abovementioned method may be implemented by a program instructing the related hardware, and the abovementioned program may be stored in a computer readable storage medium, such as a read only memory, magnetic or optical disk. Alternatively, all or some of the steps in the abovementioned embodiment can also be implemented with one or more integrated circuits. Accordingly, each module/unit in the abovementioned embodiment can be realized in the form of hardware or software functional modules. The embodiments of the present document are not limited to any particular form of the combination of hardware and software.

The abovementioned embodiments are merely used to describe, but not intended to limit the technical scheme of the present document, and they only describe the technical scheme of the present document in detail with reference to the preferred embodiments. A person of ordinary skill in the art should understand that, the technical scheme of the present document can be modified or replaced with equivalents without departing from the spirit and scope of the technical scheme of the present document, and such modifications or equivalents may be included within the scope of claims of the present document.

INDUSTRIAL APPLICABILITY

The embodiments of the present document can distinguish the R11 UE and the R12 UE, and ensure to support both the R12 UE and the R11 UE normally accessing to the 3GPP core network through the 3GPP access system and the non-3GPP access system simultaneously.

We claim:

1. A method for updating identity information of a packet gateway, comprising:
   a decision-making network element receiving a message which carries user equipment (UE) capability indication information and is sent by an information transmission network element; and
   the decision network element deciding whether to update the identity information of the packet gateway or not according to the UE capability indication information carried in the message and/or local information;
   wherein, the step of the decision-making network element receiving the message which carries the UE capability indication information and is sent by the information transmission network element comprises:
   an authentication, authorization, and accounting (AAA) server receiving an Extensible Authentication Protocol (EAP) authentication message which carries the UE capability indication information and is sent by a trusted non-3GPP access network (TNAN) network element; or
   the AAA server receiving a packet gateway address update message which carries the UE capability indication information and is sent by the packet gateway, wherein, the packet gateway acquires the UE capability indication information from a session creation request message or a proxy binding update message sent by the TNAN network element; or
   the packet gateway receiving the session creation request message or the proxy binding update message which is transmitted by the TNAN network element and carries the UE capability indication information;
   wherein,
   when the decision-making network element is the AAA server, the step of the decision-making network element deciding whether to update the identity information of the packet gateway or not according to the UE capability indication information carried in the message and/or the local information comprises:
   when the AAA server determines that a current UE is a R12 UE and is in a handover procedure according to the UE capability indication information and/or the local information, do not update the address of the P-GW or the GGSN to a Home Subscriber Server (HSS);
   when the AAA server determines that the current UE is a R12 UE and accesses for the first time according to the UE capability indication information and/or the local information, update the address of the P-GW or the GGSN to the HSS; or
   when the AAA server determines that the current UE is a R11 UE according to the UE capability indication information and/or the local information, do not update the address of the P-GW or the GGSN to the HSS;
   when the decision-making network element is the packet gateway, the step of the decision-making network element deciding whether to update the identity information of the packet gateway or not according to the UE capability indication information carried in the message and/or the local information comprises:
   when the packet gateway determines that the current UE is a R12 UE and is in the handover procedure according to the UE capability indication information and/or the local information, do not update the address of the packet gateway to the AAA server or the HSS;
   when the packet gateway determines that the current UE is a R12 UE and accesses for the first time according to the UE the capability indication information and/or the local information, update the address of the packet gateway to the HSS or the AAA server; or
   when the packet gateway determines that the current UE is a R11 UE according to the UE capability indication information and/or the local information, do not update the address of the packet gateway to the HSS or the AAA server.

2. The method of claim 1, wherein,
the UE capability indication information is information about difference between different versions of the UE, requested access point name (APN) information, a request type, a type of service requested by the UE, or a type of packet data network (PDN).

3. The method of claim 2, wherein,
the step of the decision-making network element receiving the message which carries the UE capability indication information and is sent by the information transmission network element comprises:
an authentication, authorization, and accounting (AAA) server receiving an Extensible Authentication Protocol (EAP) authentication message which carries the UE capability indication information and is sent by a trusted non-3GPP access network (TNAN) network element; or
the AAA server receiving a packet gateway address update message which carries the UE capability indication information and is sent by the packet gateway, wherein, the packet gateway acquires the UE capability indication information from a session creation request message or a proxy binding update message sent by the TNAN network element; or
the packet gateway receiving the session creation request message or the proxy binding update message which is transmitted by the TNAN network element and carries the UE capability indication information.

4. The method of claim 1, wherein,
the packet gateway is a packet data network gateway (P-GW) or a gateway general packet radio service support node (GGSN).

5. The method of claim 1, wherein,
after the step of the decision-making network element receiving the message which carries the UE capability indication information and is sent by the information transmission network element, the method further comprises:
the AAA server sending the UE capability indication information to the HSS.

6. An information transmission method, comprising:
an information transmission network element acquiring user equipment (UE) capability indication information;
the information transmission network element sending a message carrying the UE capability indication information to a decision-making network element;
the decision-making network element deciding whether to update an identity information of a packet gateway or not according to the UE capability indication information carried in the message and/or the local information;
wherein, the step of the information transmission network element sending the message carrying the UE capability indication information to the decision-making network element comprises:
a trusted non-3GPP access network (TNAN) network element sending an Extensible Authentication Protocol (EAP) authentication message carrying the UE capability indication information to an authentication, authorization, and accounting (AAA) server; or
the TNAN network element sending the packet gateway a proxy binding update message or a session creation request message carrying the UE capability indication information;
wherein,
when the decision-making network element is the AAA server, the step of the decision-making network element deciding whether to update the identity information of the packet gateway or not according to the UE capability indication information carried in the message and/or the local information comprises:
when the AAA server determines that a current UE is a R12 UE and is in a handover procedure according to the UE capability indication information and/or the local information, do not update the address of the P-GW or the GGSN to a Home Subscriber Server (HSS);
when the AAA server determines that the current UE is a R12 UE and accesses for the first time according to the UE capability indication information and/or the local information, update the address of the P-GW or the GGSN to the HSS; or
when the AAA server determines that the current UE is a R11 UE according to the UE capability indication information and/or the local information, do not update the address of the P-GW or the GGSN to the HSS;
when the decision-making network element is the packet gateway, the step of the decision-making network element deciding whether to update the identity information of the packet gateway or not according to the UE capability indication information carried in the message and/or the local information comprises:
when the packet gateway determines that the current UE is a R12 UE and is in the handover procedure according to the UE capability indication information and/or the local information, do not update the address of the packet gateway to the AAA server or the HSS;
when the packet gateway determines that the current UE is a R12 UE and accesses for the first time according to the UE the capability indication information and/or the local information, update the address of the packet gateway to the HSS or the AAA server; or
when the packet gateway determines that the current UE is a R11 UE according to the UE capability indication information and/or the local information, do not update the address of the packet gateway to the HSS or the AAA server.

7. The method of claim 6, wherein,
the UE capability indication information is information about difference between different versions of the UE, requested access point name (APN) information, a request type, a type of service requested by the UE, or a type of packet data network (PDN).

8. The method of claim 7, wherein,
the step of the information transmission network element sending the message carrying the UE capability indication information to the decision-making network element comprises:
a trusted non-3GPP access network (TNAN) network element sending an Extensible Authentication Protocol (EAP) authentication message carrying the UE capability indication information to an authentication, authorization, and accounting (AAA) server; or
the TNAN network element sending the packet gateway a proxy binding update message or a session creation request message carrying the UE capability indication information.

9. The method of claim 6, wherein,
the packet gateway is a packet data network gateway (P-GW) or a gateway general packet radio service support node (GGSN).

10. The method of claim 6, wherein:
after the step of the TNAN network element sending the packet gateway the proxy binding update message or the session creation request message carrying the UE capability indication information, the method further comprises:
the packet gateway sending the AAA server a packet gateway address update message carrying the UE capability indication information.

* * * * *